United States Patent [19]

Gruber

[11] 4,169,685
[45] Oct. 2, 1979

[54] TAB LAYOUT DISPLAY FOR A TYPEWRITER

[75] Inventor: William C. Gruber, Lexington, Ky.

[73] Assignee: International Business Machines Corporation, Armonk, N.Y.

[21] Appl. No.: 863,206

[22] Filed: Dec. 22, 1977

[51] Int. Cl.² ............................................. B41J 29/50
[52] U.S. Cl. ................................. 400/705.4; 400/279; 400/711
[58] Field of Search ................... 400/7, 15, 61, 76, 83, 400/279, 293, 705, 705.1, 705.4, 710, 711; 364/900

[56] References Cited

U.S. PATENT DOCUMENTS

| | | | |
|---|---|---|---|
| 3,137,381 | 6/1964 | Behr et al. | 400/705.4 |
| 3,559,792 | 2/1971 | Guldenpfennig | 400/15 |
| 3,648,271 | 3/1972 | McConnell et al. | 364/900 |
| 3,711,837 | 1/1973 | Smith et al. | 400/710 |
| 3,805,940 | 4/1974 | Stockham | 400/15 X |
| 3,885,663 | 5/1975 | Suzuki | 400/279 |
| 3,923,138 | 12/1975 | Willcox | 400/76 |
| 3,998,311 | 12/1976 | Greek et al. | 400/7 |

FOREIGN PATENT DOCUMENTS

| | | | |
|---|---|---|---|
| 2403653 | 7/1975 | Fed. Rep. of Germany | 400/279 |
| 1443050 | 7/1976 | United Kingdom | 400/279 |

OTHER PUBLICATIONS

IBM Technical Disclosure Bulletin, "Indicator Display", Bagley et al., vol. 11, No. 3 Aug. 1968, pp. 281-282.

IBM Technical Disclosure Bulletin, "Column Layout Control for an Electronically Controlled Typewriter", Clanoy et al., vol. 17, No. 12, May 1975 pp. 3625-3629.

IBM Technical Disclosure Bulletin, "Low-Cost Display for Typewriter System," Kolpek, vol. 19, No. 2, Jul. 1976, p. 563.

IBM Technical Disclosure Bulletin, "Electronic Typewriter for the Handicapped", Suding, vol. 19, No. 5 Oct. 1976, pp. 1624-1625.

*Primary Examiner*—Ernest T. Wright, Jr.
*Attorney, Agent, or Firm*—George E. Grosser

[57] ABSTRACT

A panel of selectively-controllable indicator elements is associated with a viewable escapement scale on a typewriter and provides an indication of a set of operative tab stops stored in an electronic memory. Escapement position codes extracted from an electronic tab storage drive a logic circuit that is so connected as to modify the state of individual panel elements at corresponding escapement scale positions to indicate a tab layout. By providing, in a preferred implementation, means for accessing the presently operative (selected) set of tab codes from a memory adapted to retain plural tab sets, the operator is enabled to assess the layout of each selection visually. In such an implementation for a typewriter having two different selectable pitches, say pitches of 10 and 12 characters per inch, the panel elements are arranged to display the selected tab layout respective of pitch.

7 Claims, 9 Drawing Figures

$M = (N-1) \times 16$

TAB LAYOUT DISPLAY FOR A TYPEWRITER

BACKGROUND OF THE INVENTION

1. Field of the Invention

The invention relates generally to typewriters and, in particular, to apparatus for providing visual feedback to an operator regarding typewriter conditions or selections.

2. Statement Regarding the Prior Art

It is well known in the typewriter art to provide tab stop capability to facilitate the formatting of typewritten material. The tab stops are typically set by the operator in sequence and are stored either within a "mechanical memory", e.g., by displacing tab stop elements to an operative position, or within an electronic memory. Since the tab selection involves appearance considerations, it is desirable for the operator to have visual feedback of the stored tab settings.

In this regard, U.S. Pat. No. 3,923,138 describes a typewriter that provides visible feedback of a tab layout by means of indicator portions of selectively displaceable tab stop elements. Such indicator portions are displayed alongside a viewable scale which has markings corresponding to escapement distances.

Similarly, displaced elements are described for indicating margin selections and present carrier position in the IBM Technical Disclosure Bulletin dated 5/68, Vol. 10, No. 12 at page 1909. Unfortunately, "displaceable element" arrangements for indicating escapement positions are difficult to implement where position information is stored in an electronic memory and, in particular, where a plurality of selections are recallable at operator option.

Viewable feedback regarding escapement position settings that does not utilize mechanical displacement of indicator elements has been provided in typewriter systems employing video displays. For example, in U.S. Pat. No. 3,648,271, a video display is described that shows a scale corresponding to an operative pitch selection and indicates right and left margin positions on that scale. While such a video display offers great flexibility for operator feedback it is limited to rather expensive machines since the display and associated drive apparatus would typically have a cost that is substantial in relation to the cost of a basic typewriter.

It would be desirable to provide visual feedback of formatting selections in a low-priced typewriter. And, it would be desirable if the layout of a set of tabs selected from an electronic memory of a typewriter could be displayed to the operator so that selections among plural stored tab sets are conveniently reviewable.

SUMMARY OF THE INVENTION

A panel of selectively actuable indicator elements is associated with an operator viewable escapement scale on a typewriter and so cooperates with an electronic tab code storage through a logic circuit that the layout of a presently selected set of tab stops is displayed. Preferably, codes indicating an operative set of tab stops are read from storage after selection by the operator and are retained in a buffer although, as an alternative, they may be read periodically from storage, at a repeat rate chosen to give an indicator element the appearance of continuous activation. Such codes are supplied to a logic network that is so connected that a given code changes the state (say lit versus unlit) of a correspondingly positioned element—e.g., a light emitting diode (LED) or liquid crystal element along a line array on the panel.

A presently preferred implementation of the invention is intended for use in a typewriter having two pitch selections and permitting two tab sets to be stored for each pitch. For that implementation, a separate scale is provided for each pitch and respective line arrays of LEDs are arranged to have elements that correspond to the individual escapement scale positions. Upon selection, a set of tab codes is read into the display register, each such code including a bit for indicating the selected pitch. The display logic is so connected that a given code causes energization of the particular LED at the corresponding escapement position along the scale for the selected pitch.

It should be appreciated that the desired tab set indication can also be achieved by deactivating selected elements (e.g., lamps) in a field that is otherwise activated. Also, the specially controlled visible indication may be the result of a change in reflected illumination or a blocking of illumination, for example, using liquid crystal technology. And, indications may be provided based on escapement codes for right and left margins as well as tab codes.

A presently preferred form for the invention will now be described in detail with reference to the drawing wherein.

Figure 1:
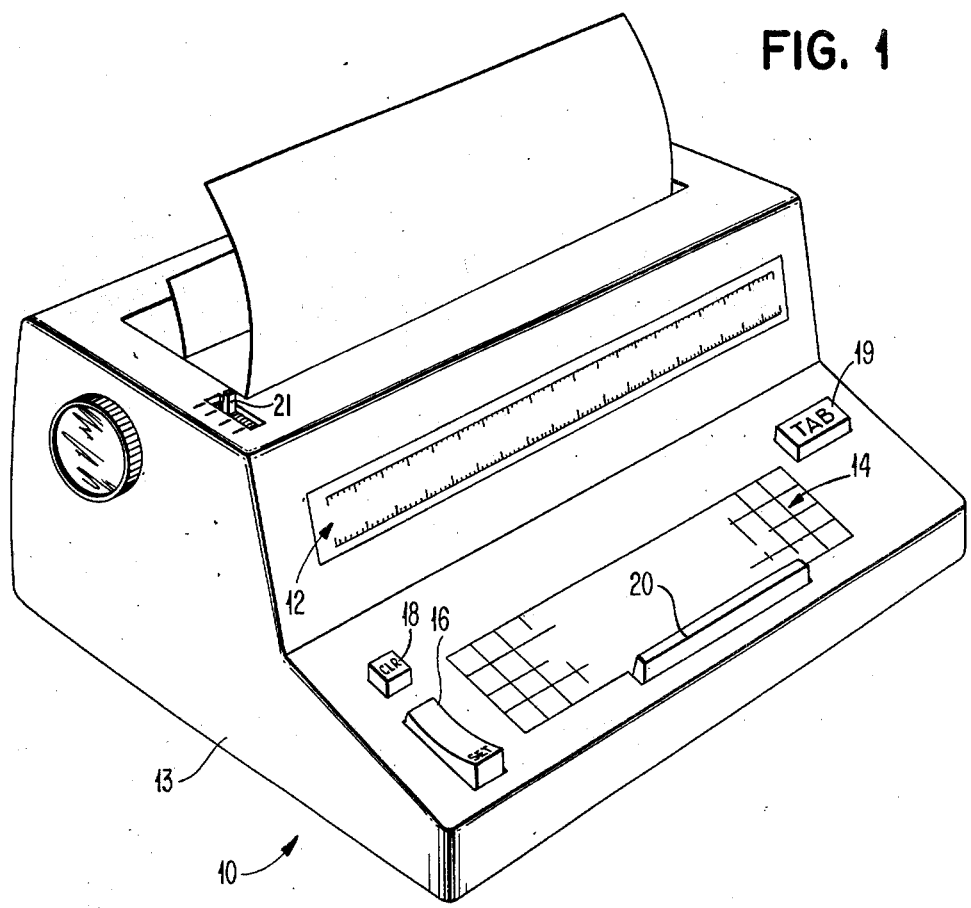
FIG. 1 is a perspective view of a typewriter adapted to operate in accordance with the invention.

Referring to FIG. 1, a typewriter 10 adapted to incorporate, in a preferred form, the improvement of the invention includes an escapement scale 12, which is arranged on a cover 13 to be easily viewed from a normal typing position, and a keyboard 14 which includes a tab set key 16 (or key combination), a tab clear key 18, a tab key 19, and a space bar 20, along with various character and functional keys (not specifically denoted). Also provided is a four-position tab and pitch selector switch 21 having two positions for each of two escapement pitches (ten and twelve characters per inch).

Figure 2:
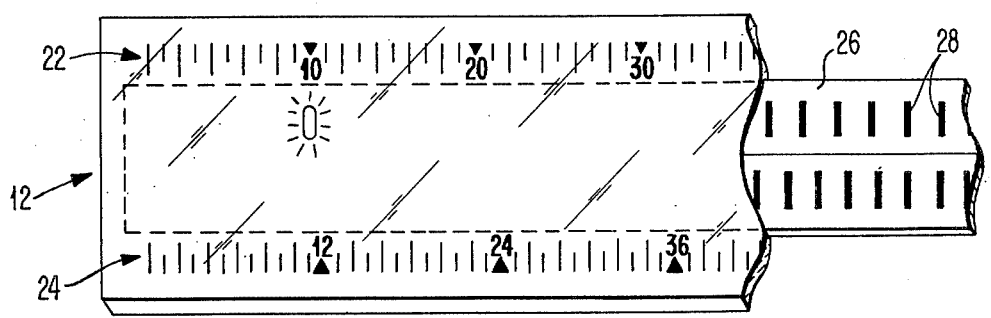
FIG. 2 is a partial perspective view of a cooperating scale and element panel combination according to the presently preferred implementation for the invention.

As is seen more clearly in FIG. 2, the scale 12, for the presently preferred implementation of the invention, has sets of escapement markings 22 and 24 for ten- and twelve-character-per-inch pitches respectively. It is preferred that such markings are spaced by distances equal to actual escapement distances in order to give the operator an accurate feel for an indicated tab layout. The scale 12 is transparent or semi-transparent and an indicator panel 26 is located behind the scale from the operator's viewpoint. Alignments of individually controllable indicator elements 28 (discussed in more detail below) are arranged on the panel 26 at positions corresponding to the markings in sets 22 and 24. The elements 28 may be, for example, light emitting diodes (LEDs) and when activated provide a visible indication through the scale 12 as depicted below the "10" position of the set of marks 22.

It should be appreciated that, with two different pitches, the markings for the longer pitch could, as an alternative, be compressed to permit one row of elements 28 to indicate both pitches. Such scale compression, however, while permitting a simpler display structure has the disadvantage of requiring a departure from true dimensions in layout representation.

Figure 3:
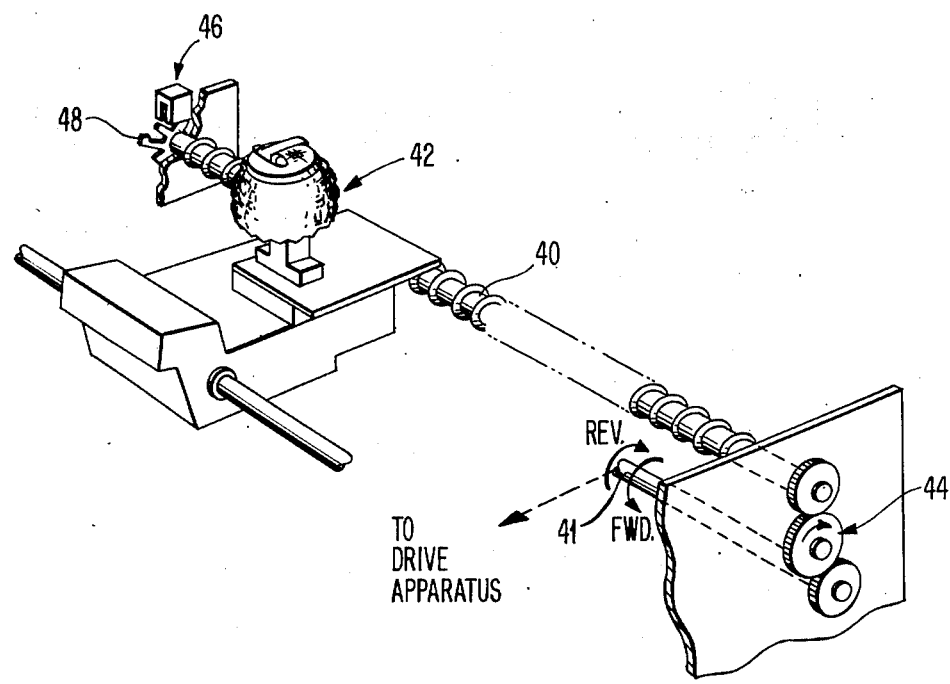
FIG. 3 is a partial perspective view of a typewriter indicating an electronic escapement detection arrangement suitable to produce tab code signals for use according to the invention.

Referring to FIG. 3, a carrier drive arrangement suitable to facilitate tab position encoding includes a lead screw 40 driven off a drive shaft 41 by a gear train 44. Rotation of the lead screw 40 causes escapement axis movement of a type unit carrier 42. A detector 46 for indicating escapement motion increments is of the magnetic reluctance type and includes a spoked wheel 48 that is connected to rotate with the lead screw 40 for triggering pulse signals ($S_E$) at fixed angular increments. Six pulses, for the presently preferred implementation, correspond to one "ten-pitch" escapement and 5 pulses correspond to one "twelve-pitch" escapement.

Figure 4:
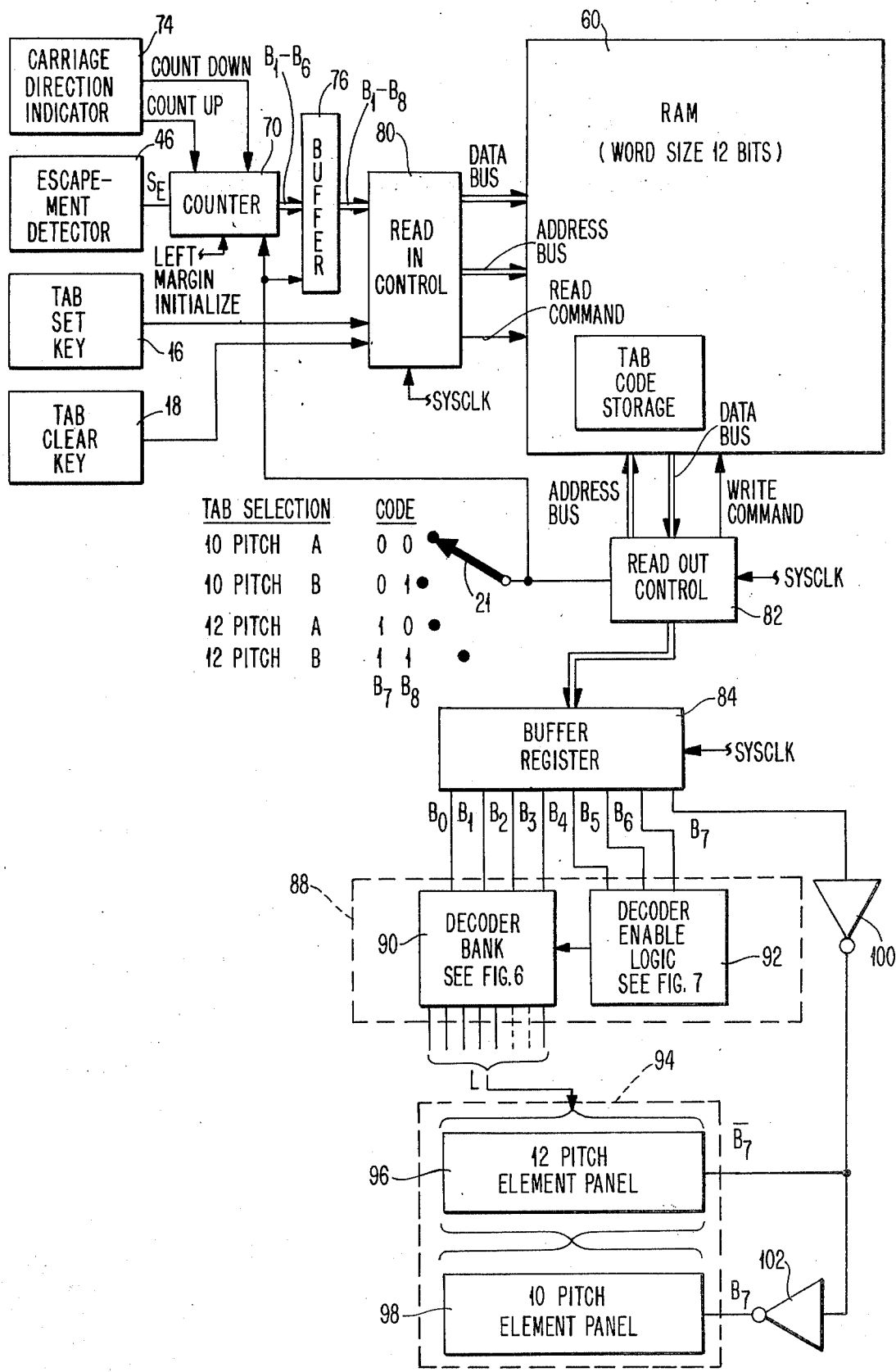
FIG. 4 is a circuit diagram indicating the signal processing strategy which is presently preferred for implementing the invention.

Referring to FIG. 4, preferred tab storage 60 for a typewriter implementing the invention is a random access memory (RAM) that stores code words representative of tab stop positions in a storage area dedicated to that purpose. Such code words may be produced, for example, by a counter 70 cooperating with the escapement detector 46 (see also FIG. 1). Escapement pulses ($S_E$) are added or subtracted to a total at the counter 70 in accordance with signals from a carrier direction indicator 74, e.g., forward and reverse signals from a drive direction controller (not shown) may be used. An increment to the total occurs for 6 or 5 pulses of the detector 46 depending on whether ten-pitch or twelve-pitch operation respectively has been selected (as indicated by bit $B_7$).

The two states for the logic system will be referred to as TRUE (or "1") and FALSE (or "0"), and could be any two distinct signal states causing appropriate responses by the logic circuitry.

Escapement code bits ($B_1$ through $B_6$) generated at the counter 70 are stored in a buffer 76 along with selection code bits ($B_7$ and $B_8$) from the switch 21. For coding as indicated in FIG. 4, the state of bit $B_7$ represents the selected pitch and the state of bit $B_8$ indicates the selected tab set (A or B) for a given pitch.

Tab code storage in a section of the RAM 60 is coordinated by a read-in control 80 which may be incorporated as a function of a microprocessor. Desired tab positions are located by the operator using, for example, the space bar 20 (FIG. 1). Codes are stored in response to a "tab set" signal triggered by the key 16 and are erased in response to a "tab clear" signal triggered by key 18. Tab codes may, for example, be stored sequentially beginning at a start address for each set (set identity is established by switch 21) as is well known in the art for storing data words for subsequent retrieval. Retrieval of stored codes is coordinated by a read-out control 82 which may be implemented within a single microprocessor along with the control 80. The control 82 generates address signals and a write command, in response to positioning of the switch 21, to cause stored tab codes to be asserted in a sequence as words on a data bus, as is also well known in the art of data storage and retrieval.

The tab codes of a set are after retrieval read into a buffer register 84. Synchronization of storage operations is achieved using a clock signal SYSCLK.

Register 84 has sufficient stages to accommodate the maximum number of codes that may be included in a tab set, say five stages. Codes from a set stored in register 84 are circulated to an output stage for transmission to an indicator-element selector 88 where bits $B_0$ through $B_3$ drive a decoder bank 90 and bits $B_4$ through $B_6$ drive a decoder-bank control 92.

Figure 5:
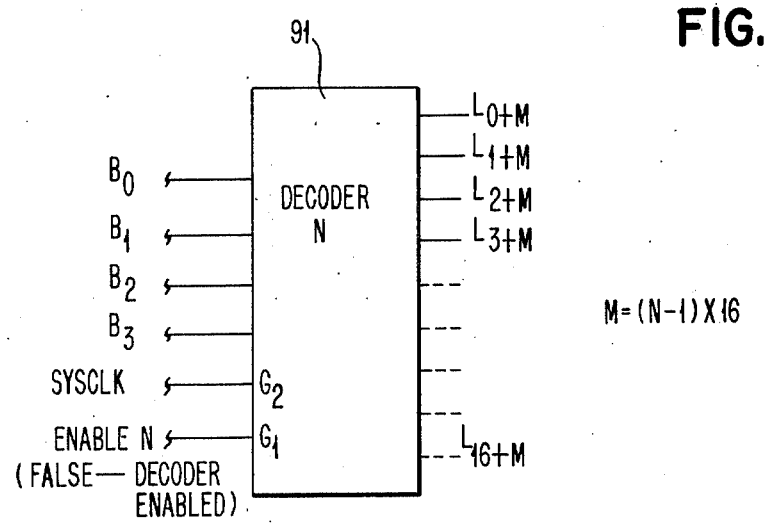
FIG. 5 is a circuit diagram indicating decoder connections.
Figure 6:
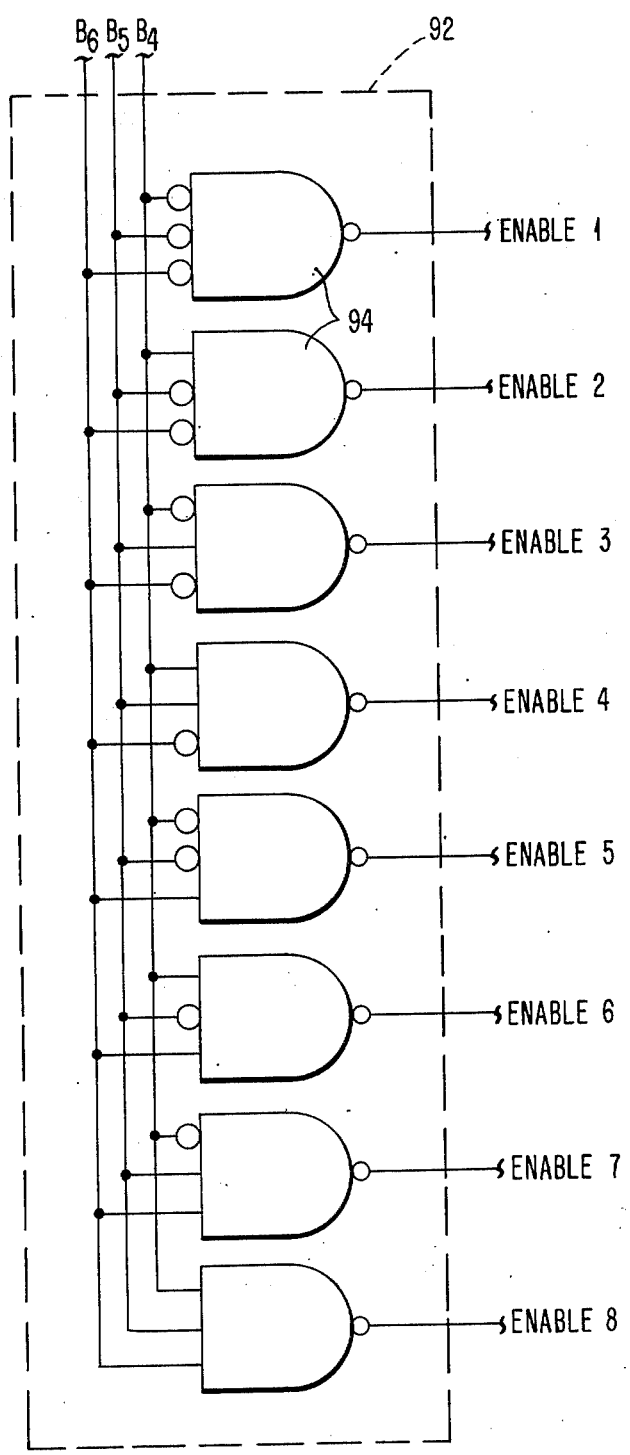
FIG. 6 is a circuit diagram of logic circuitry for controlling the enablement of the decoders in accordance with a binary escapement code.

In FIG. 5 a generalized decoder unit 91 is illustrated for the decoder bank 90 which includes eight such units (hence N=1, 2, ... 8). The inputs are the inputs to the bank 90 and output signals "L" are referenced to individual lamp positions in a sequence. Each decoder unit 91 has 16 outputs which correspond to numbers represented by a four bit input. Enable signals (note a logic "FALSE" is assumed to enable the decoder) for the individual decoder units 91 are produced by the logic circuitry of control 92 (see FIG. 6) which includes NAND gates 94 that go FALSE for respective unique state combinations for bits $B_4$, $B_5$ and $B_6$.

The individual L signals from the decoder bank 90 are by the above described arrangement caused to be TRUE for only one state combination of bits $B_1$ through $B_6$, that combination representing in binary the corresponding signal number for the L signal sequence.

Figure 7:
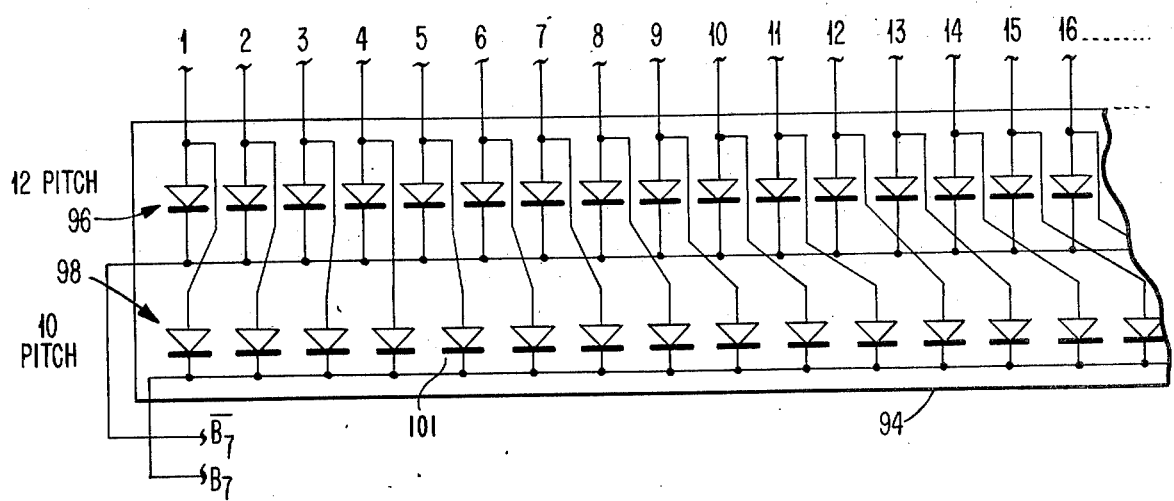
FIG. 7 is a circuit diagram of an LED panel for use according to the invention.
Figure 8:
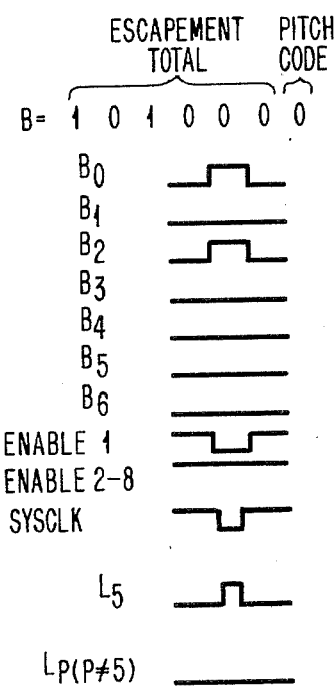
FIG. 8 is a graphical representation indicating sample signal waveforms for the circuitry of FIG. 4.

Referring again to FIG. 4 the L signals are supplied to composite panel 94 which includes a ten pitch element alignment 98 and a twelve-pitch element alignment 96. Bit $B_7$ after modification by first and second inverters 100 and 102 serves to control panel enablement respective of pitch selection. A given panel element (see FIG. 7), say the LED element 101, is activated only when the anode is in the TRUE state and the cathode is in the FALSE state. Hence a ten-pitch element can be activated only when $B_7$ is FALSE and a twelve-pitch element only when $B_7$ is TRUE. The L signal channels are connected to the elements in sequence from a zero escapement position to the maximum escapement position so that a given binary code ($B_1$ through $B_6$) drives selector 88 to activate the element anode at the corresponding escapement position. An example is indicated in FIG. 8 that is based on a tab code that would cause the fifth LED of the ten-pitch panel to be illuminated.

Figure 9:
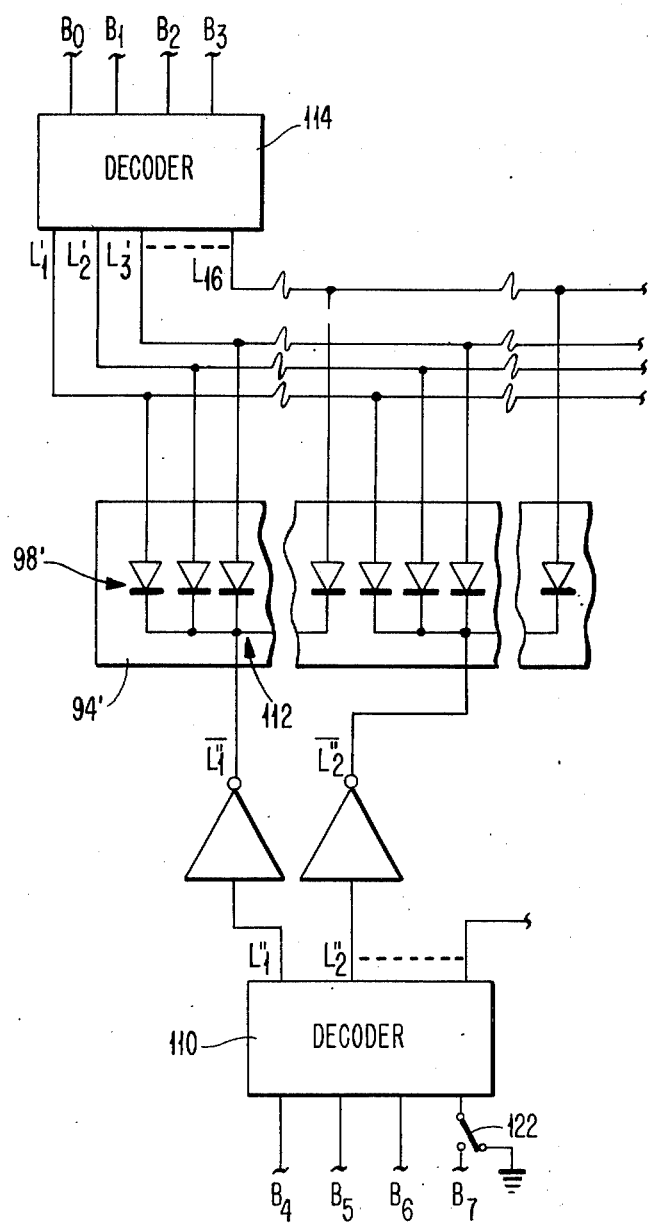
FIG. 9 is an alternative for implementing the invention using decoders to drive an LED panel in a push-pull manner.

Referring to FIG. 9, an alternative for implementing the invention utilizes a first decoder 110 to control (via the signals denoted L″) the cathodes of individual banks of sixteen elements in a panel 94′, e.g., a bank 112, in accordance with bits $B_4$, $B_5$ and $B_6$ while a second decoder 114 controls (via the signals denoted L′) respective anodes in each such bank.

While there is only one alignment of indicator elements 98′ for the implementation of FIG. 9 as shown, a panel for two different pitches, similar to panel 94 (FIG. 7), may be used if bit $B_7$ is supplied as input to decoder 110 (e.g., through switch 122). The cathodes for the ten pitch alignment would then be connected to outputs L″ of the decoder 110 that correspond to bit $B_7$ to be in the FALSE state and the twelve-pitch cathode banks would be connected to outputs L" of the decoder 110 that correspond to the bit B$_7$ in the TRUE state.

The invention has been described in detail with respect to presently preferred implementations thereof; however, variations and modifications are possible that come within the spirit and scope of the invention. For example, individually signal controlled indicator elements other than LED's may be employed and the indicators may be alongside the scale rather than being behind the scale so as to transmit light therethrough. Also, a line display may be employed that has discretely activated position indications even though the structure at each position is not discrete. And, margin codes may be extracted from memory to cause activation of elements at corresponding escapement positions.

What is claimed is:

1. For use in a typewriter including means for storing, in an electronic storage unit, tab codes representing at least one set of escapement positions, a tab layout display comprising:
    a scale having at least one set of markings corresponding to escapement positions;
    an alignment of indicator elements, such elements being independently signal actuable to change appearance and being positioned for association with respective escapement position markings on said scale;
    means for extracting a set of tab codes from such storage;
    and logic means, connected to said alignment of indicator elements, for receiving codes from said extracting means and for responsively producing signals to change the appearance of elements corresponding to such codes, whereby the layout represented by the codes is indicated.

2. A display according to claim 1 wherein said indicating elements are individual light emitting diodes arranged at spaced intervals along a substrate.

3. For use in a typewriter having an electronic storage for at least one set of escapement codes representing tab positions, a display comprising:
    means for reading a set of escapement codes from said tab storage;
    a viewable scale bearing escapement markings;
    a set of independently actuable lamps which are located adjacent to respective escapement scale positions; and
    selecting means connected to said reading means for actuating said lamps in accordance with the accessed set of tab escapement codes.

4. A display according to claim 3 wherein said scale bears markings for more than one escapement pitch and said selecting means includes means responsive to a pitch selection signal and actuates said lamps in accordance with both the pitch signal and the escapement position codes.

5. A tab display system for use with a typewriter that produces tab position signals that represent escapement count numbers, said display comprising:
    a light transmitting scale panel having a front face and including viewable markings corresponding to numbered escapement positions, an indicator panel arranged behind said scale panel having a set of independently actuable lamps that are adjacent to respective markings on said scale panel, logic means, responsive to said tab position signals, for selectively illuminating the lamp adjacent the corresponding marking, and means for supplying the tab position signals to said logic means.

6. A display system for use with a typewriter that has a storage for receiving plural sets of coded signals that represent discrete escapement positions, said display comprising:
    a scale including viewable markings corresponding to said discrete escapement positions;
    an indicator panel associated with said scale and having a set of aligned zones that are independently actuable to change appearance, such zones being adjacent to respective markings on said scale;
    logic means, responsive to said escapement position coded signals, for selectively actuating the zone of said indicator panel that is adjacent the corresponding marking of said scale, and means for supplying a set of escapement position coded signals to said logic means.

7. A display system according to claim 6 wherein said position code supplying means includes selecting means for producing a signal indicating a selected set of position codes and means responsive to said selection signal for reading the selected set of position codes from said storage.

* * * * *